(12) United States Patent
Huggett et al.

(10) Patent No.: US 6,301,136 B1
(45) Date of Patent: Oct. 9, 2001

(54) FLOATING FLAME CONTROLLER

(75) Inventors: Colin Huggett, Torrance; Gabor Kalman, Palos Verdes, both of CA (US)

(73) Assignee: Honeywell International Inc., Morristown, NJ (US)

( * ) Notice: Subject to any disclaimer, the term of this patent is extended or adjusted under 35 U.S.C. 154(b) by 125 days.

(21) Appl. No.: 09/619,581

(22) Filed: Jul. 19, 2000

(51) Int. Cl.$^7$ .............................. H02M 7/515; H02P 5/40
(52) U.S. Cl. ................................................ 363/95; 318/805
(58) Field of Search ........................ 363/95, 97; 318/805, 318/807, 701

(56) References Cited

U.S. PATENT DOCUMENTS

| | | |
|---|---|---|
| 5,334,923 * | 8/1994 | Lorenz et al. ........................ 318/805 |
| 5,428,283 * | 6/1995 | Kalman et al. ........................ 318/729 |
| 5,448,149 | 9/1995 | Ehsani et al. . |
| 5,467,025 | 11/1995 | Ray . |
| 5,502,360 * | 3/1996 | Kerkman et al. ..................... 318/805 |
| 5,589,751 | 12/1996 | Lim . |
| 5,717,305 * | 2/1998 | Seibel et al. ......................... 318/778 |
| 5,867,004 | 2/1999 | Drager et al. . |
| 5,903,129 | 5/1999 | Okuno et al. . |
| 5,920,175 | 7/1999 | Jones et al. . |
| 5,949,204 * | 9/1999 | Huggett et al. ...................... 318/254 |
| 5,986,419 | 11/1999 | Archer et al. . |
| 6,002,234 * | 12/1999 | Ohm et al. .......................... 318/729 |
| 6,008,618 * | 12/1999 | Bose et al. .......................... 318/811 |

* cited by examiner

Primary Examiner—Adolf Deneke Berhane
(74) Attorney, Agent, or Firm—William J. Zak, Jr., Esq.

(57) ABSTRACT

A floating frame controller determines a current Park vector, selects a reference frame for the current Park vector, and adjusts the reference frame until a quadrature component of a current Park vector in the adjusted reference frame is equal to a predetermined value, whereby a synchronous reference is established. The synchronous frame is used to control a power converter. The floating frame controller can drive a synchronous machine without the use of rotor position sensors.

16 Claims, 2 Drawing Sheets

US 6,301,136 B1

FLOATING FLAME CONTROLLER

BACKGROUND OF THE INVENTION

The invention relates to electrical power conversion. More specifically, the invention relates to a controller for a power converter such as an inverter.

A synchronous motor typically utilizes rotor position sensors for providing information regarding the position of the motor's rotor with respect to the motor's stator windings. The positional information allows for proper conversion of power that is supplied to the stator windings. Rotor position sensors such as Hall effect devices are typically mounted in the stator, proximate the stator windings. The rotor position sensors provide intelligence relative to rotor position.

Rotor position sensors can be unreliable due to mechanical alignment problems (e.g., problems caused by bearings) and temperature incompatibility problems between the stator windings and electronic components such as the Hall effect devices. Moreover, the rotor position sensors can be difficult to mount to the motor during motor assembly, especially for multi-pole motors. In multi-pole motors, the electrical misalignment angle is equivalent to the angular mechanical misalignment angle multiplied by the number of pairs of poles.

SUMMARY OF THE INVENTION

According to one aspect of the invention, a system includes a synchronous machine and a power converter. The power converter is controlled by measuring line current; determining a current Park vector from the current measurement; selecting a reference frame for the current Park vector; rotating the reference frame until a quadrature component of a current Park vector in the rotated reference frame is equal to a predetermined value, whereby a synchronous reference frame is established; and using the synchronous reference frame to control the converter. Thus, the inverter is controlled without the use of rotor position sensors.

DETAILED DESCRIPTION OF THE INVENTION

Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

Figure 1:
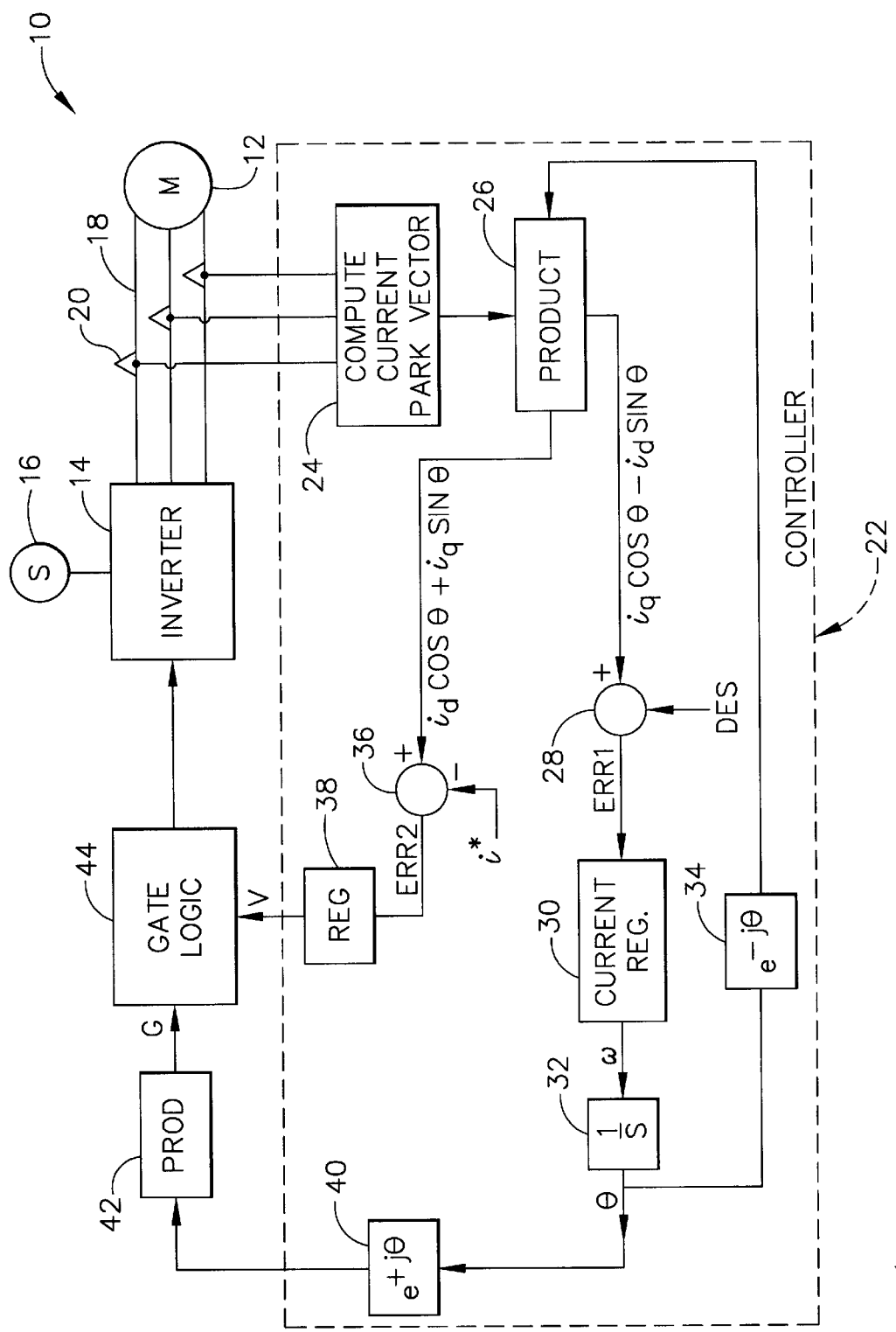
FIG. 1 is an illustration of a system including a synchronous machine, an inverter and a floating frame controller.

FIG. 1 illustrates a synchronous machine drive system 10 including a three-phase synchronous machine 12, an inverter 14 and a power source 16 for supplying dc power to the inverter 14. During operation of the synchronous machine 12, the inverter 14 converts the dc power to three-phase ac power and supplies (via a power line 18) currents to all three stator windings of the machine 12. These currents flow through the windings and create a rotating magnetic field.

Because of the spatial relationship of the stator windings and the temporal relationship of the phase currents, the Park vector representing the phase currents may be represented by a two-dimensional complex number (provided that the neutral of the stator windings is not galvanically tied to any point in the inverter 14). Similarly, voltages and rotor flux can be represented by their own voltage and flux Park vectors.

The rotating magnetic field interacts with main field flux provided by the machine's rotor, resulting in a torque. The torque is constant if the main field flux Park vector and the current Park vector are maintained at a constant angle relative to one another and the amplitude of the current Park vector is constant. Maximum torque occurs at a ninety degree angle and minimum torque occurs at a zero degree angle.

If a rotor reference frame (that is a reference frame that coincides with the magnetic axis of the rotor) is known, the current Park vector can be converted from a stationary reference frame to a synchronous reference frame with respect to the rotor, and the inverter 14 can be controlled by D–Q current regulation in the synchronous reference frame. The objective is finding the reference frame without the use of rotor position sensors.

The system 10 estimates the reference frame without using position sensors. The system 10 further includes a set of current sensors 20 for sensing current on the power line 18 and a floating frame controller 22 for controlling the inverter 14 to convert the dc power to suitable three-phase ac power. Each current sensor 20 is synchronously and periodically sampled. Thus, a set of current samples ($i_a$, $i_b$, $i_c$) is produced periodically.

Each time a set of current samples ($i_a$, $i_b$, $i_c$) is produced, the controller 22 computes a current Park vector from the current samples (block 24). The current Park vector ($i^s$) can be decomposed into a direct-axis component ($i_d$) and a quadrature axis component ($i_q$). Thus, $i^s = i_d + ji_q$.

Figure 2:
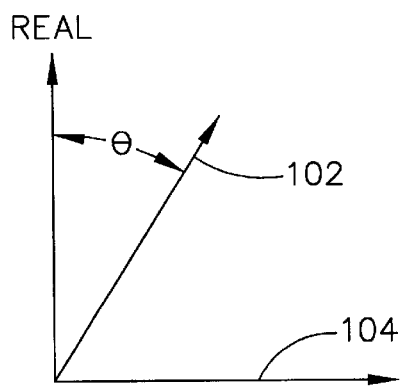
FIG. 2 is an illustration of Park vectors representing a reference frame and line current.

After the line current is sampled, the controller 22 selects a reference frame for the current Park vector. The reference frame may be represented by a unit amplitude Park vector as a complex number in polar coordinates in the form of ($e^{-j\theta}$) or in Cartesian coordinates in the form of ($\cos\theta - j\sin\theta$). Initially, the reference frame is arbitrary. Afterwards, however, the reference frame will be adjusted to be synchronous with the rotor. A Park vector 102 representing the reference frame and a Park vector 104 representing the line current are illustrated in FIG. 2.

The controller 22 performs a multiplication (block 26) of the reference frame ($e^{j\theta}$ or $\cos\theta - j\sin\theta$) and the current Park vector ($i_d + ji_q$). The result of the multiplication, a current Park vector in a synchronous frame, may be expressed as:

$$i^s \times e^{-j\theta} = (i_d\cos\theta + i_q\sin\theta) + j(i_q\cos\theta - i_d\sin\theta).$$

The controller 22 rotates the reference frame so that the quadrature component ($i_q\cos\theta - i_d\sin\theta$) equals a predetermined value. The predetermined value is typically zero or some other predetermined value.

The reference frame may be rotated as follows. The controller 22 generates an error signal (block 28) from a predetermined value (DES) and the quadrature component ($i_q\cos\theta - i_d\sin\theta$) and amplifies the error signal (ERR1) in a proportional-integral ("PI") controller or current regulator (block 30) to obtain an estimated angular rate ($\omega$) of the rotor. The controller 22 integrates the estimated angular rate ($\omega$)) (block 32) to obtain an estimated angle ($\theta$). The estimated angle ($\theta$) is used to generate the reference frame in the form of $e^{-j\theta}$ (block 34).

When the quadrature component is equal to the predetermined value (DES), a synchronous reference frame is established. Because the reference frame represents the position of the rotor, the rotor position becomes known.

Once the position of the rotor is known, the controller 22 uses the magnitude of the direct component ($i_d\cos\theta + i_q\sin\theta$) to control the amplitude of the voltage applied to the inverter 14. The controller 22 generates a second error signal (ERR2) from the real portion ($i_d\cos\theta + i_q\sin\theta$) of the direct component and a current command (i*) (block 36). The current command (i*) may be derived from a higher level control loop (e.g., power transfer, speed of a machine), which is usually applicationspecific.

The second error signal (ERR2) is regulated by a direct-axis current regulator (block 38) to produce a voltage command (V). The complex conjugate $e^{+j\theta}$ of the unit amplitude Park vector is taken (block 40) and multiplied by the voltage command (V) (block 42). This multiplication converts the voltage command (V) from the synchronous frame to the stationary frame.

The vector (G) resulting from this product is supplied to gate logic 44. The gate logic 44 uses this vector (G) to turn on and off power switches of the inverter 14 in a sequence that causes the inverter to selectively energize the field windings and create a motor torque. The frequency of the switching is usually fixed at 20 kHz, the gating sequence is calculated at this frequency and is well understood by those skilled in the art.

During normal operation of the synchronous machine 12, speed can be changed by changing the value of the current command (i*). Thus, the synchronous machine may be operated at variable speeds.

Figure 3:
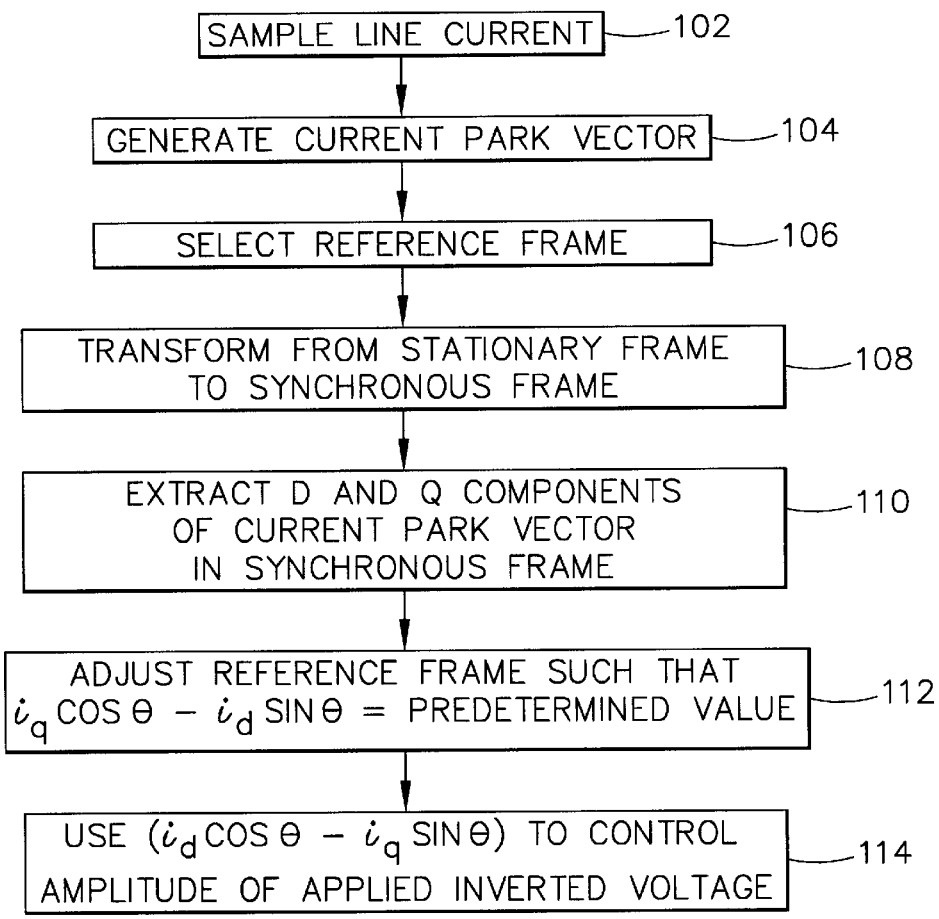
FIG. 3 is an illustration of a method of operating the inverter.

FIG. 3 shows a generalized method of operating the inverter. The method includes the steps of sampling current on a power line (block 102); generating a current Park vector from the sampled current (block 104); selecting an arbitrary reference frame for the current Park vector (block 106); transforming the current Park vector from a stationary reference frame to a synchronous frame (block 108); extracting the D and Q components of the current Park vector in the synchronous frame (block 110); adjusting the reference frame such that a quadrature component of the current in the arbitrary reference frame becomes zero or some other predetermined value (block 112); and using a direct component of the current in the arbitrary reference frame to control magnitude of the applied inverter voltage (block 114).

Thus disclosed is a system in which a synchronous machine is driven without rotor position sensors. Eliminating the rotor position sensors eliminates problems caused by mechanical alignments and temperature incompatibility between the motor windings and electronic components. Eliminating the rotor position sensors also reduces the difficulty in assembling the motor and lowers the system cost.

The floating frame controller takes advantage of the fact that time constants associated with electrical quantities are several orders of magnitudes faster than time constants associated with mechanical loads and inertia. The electrical quantities can be controlled fast enough to avoid load-angle oscillations during start-up and low speed operation.

Because of this separation of mechanical and electrical time constants, and the update rate being selected to be sufficiently large in relationship to the electrical time constants, the controller is immune to motor/source impedances and is extremely robust.

The system 10 is not limited to any particular type of synchronous machine. However, permanent magnet synchronous machines are preferable.

The system is not limited to three-phase synchronous machines. For example, the system may interface with a three-phase distribution system of the type that is commonly used in the aircraft and utility industries. The floating frame controller can synchronize with the utility in the same way it would with synchronous machine.

The controller may be a hardware or software implementation or a combination of the two. For example, a software implementation might include a digital signal processor and memory containing instructions for instructing the processor to carry out the floating frame controller functions.

Sampling rate of the line current is application specific. For example, the current sensors may sample the line current every 50 microseconds for 20 kHz chopping and 400 Hz power. The line current may be sampled at a lower frequency for 60 Hz power. In general, the electrical quantities should be controlled fast enough to avoid deleterious mechanical oscillations and transients.

The invention is not limited to the specific embodiment show above. Instead, the invention is to be construed according to the claims that follow.

We claim:

1. A method of controlling a power converter coupled to a polyphase power line, the method comprising the steps of:

measuring line current;

determining a current Park vector from the current measurement;

selecting a reference frame for the current Park vector;

adjusting the reference frame until a quadrature component of a current Park vector in the adjusted reference frame is equal to a predetermined value, whereby a synchronous frame is established; and using the synchronous frame to control the converter.

2. The method of claim 1, wherein the current is sampled periodically; and, for each set of current samples, a current Park vector is determined, the reference frame is adjusted, and the synchronous frame is used to control the converter.

3. The method of claim 1, wherein the reference frame is adjusted by generating a synchronous frame from the current Park vector and the reference frame; and changing the angle of the reference frame so that the current in the quadrature component of the synchronous frame equals the predetermined value.

4. The method of claim 3, wherein the angle of the reference frame is obtained by current-regulating the quadrature component of the product of the reference frame and the current Park vector; and integrating the current-regulated quadrature component.

5. The method of claim 1, wherein the converter is controlled by using the magnitude of a direct component of current in the synchronous frame to control amplitude of applied converter voltage.

6. The method of claim 1, wherein the converter is used to energize windings of a three-phase synchronous machine.

7. The method of claim 1, wherein the converter is used to interface with a power utility.

8. A method of operating a synchronous machine, the machine having field windings and a rotor, the method comprising the steps of:

sampling current supplied to the field windings;

generating a current Park vector from the sampled current;

selecting an arbitrary rotor reference frame for the current Park vector;

transforming the current Park vector from a stationary frame to a synchronous frame;

extracting direct and quadrature components of the current Park vector in the synchronous frame;

adjusting the rotor reference frame such that the quadrature component of the current Park vector in the synchronous frame becomes a predetermined value; and using the synchronous frame to control magnitude of the applied inverter voltage.

9. The method of claim 8, wherein the rotor reference frame is adjusted by current-regulating the quadrature component of the product of the reference frame and the current Park vector; integrating the current-regulated quadrature component to obtain an estimated angle; and adjusting the rotor reference frame to the estimated angle.

10. A system comprising:

a power converter;

gate logic for providing a sequence of gating commands to the converter;

current sensors for sampling current on an output of the converter; and a floating frame controller for the gate logic, the floating frame controller generating a current Park vector from the sampled current, selecting an arbitrary reference frame for the current Park vector; rotating the reference frame until a quadrature component of a current Park vector in the rotated reference frame is equal to a predetermined value, whereby a synchronous frame is established; and using the synchronous frame to control the converter.

11. The system of claim 10, wherein the controller samples current periodically; and, for each set of current samples, determines a current Park vector, rotates the reference frame, and uses the synchronous frame to control the converter.

12. The system of claim 10, wherein the controller rotates the reference frame by generating a synchronous frame from the current Park vector and the reference frame, and changing the angle of the reference frame so that the quadrature component of the current Park vector in the synchronous frame equals the predetermined value.

13. The system of claim 12, wherein the controller obtains the angle of the reference frame by current-regulating the quadrature component of the product of the reference frame and the current Park vector; and integrating the current-regulated quadrature component.

14. The system of claim 10, wherein the controller controls the converter by using the magnitude of a direct component of the current Park vector in the synchronous frame to control amplitude of applied converter voltage.

15. The system of claim 10, further comprising a three-phase synchronous machine having field windings coupled to an output of the converter, the gating commands causing the converter to selectively energize the field windings to create a motor torque.

16. Apparatus for controlling a power converter according to sampled line current, the controller comprising:

means for determining a current Park vector from the sampled current;

means for selecting a reference frame for the current Park vector;

means for rotating the reference frame until a quadrature component of current in the rotated reference frame is equal to a predetermined value, whereby a synchronous frame is established; and means for using the synchronous frame to control the converter.

\* \* \* \* \*